(12) United States Patent
Migliorati

(10) Patent No.: US 7,997,556 B2
(45) Date of Patent: Aug. 16, 2011

(54) FINE ADJUSTABLE FIRING VALVE

(75) Inventor: Genio Migliorati, Bergamo (IT)

(73) Assignee: Larix S.r.L., Bergamo (IT)

( * ) Notice: Subject to any disclaimer, the term of this patent is extended or adjusted under 35 U.S.C. 154(b) by 426 days.

(21) Appl. No.: 12/374,053

(22) PCT Filed: Jun. 20, 2007

(86) PCT No.: PCT/EP2007/005414
§ 371 (c)(1),
(2), (4) Date: Jan. 16, 2009

(87) PCT Pub. No.: WO2008/009337
PCT Pub. Date: Jan. 24, 2008

(65) Prior Publication Data
US 2009/0267007 A1    Oct. 29, 2009

(30) Foreign Application Priority Data
Jul. 20, 2006   (IT) .............................. MI2006A1406

(51) Int. Cl.
*F16K 31/12* (2006.01)
(52) U.S. Cl. .............................. 251/28; 251/25; 251/331

(58) Field of Classification Search ............... 251/12, 251/25, 28
See application file for complete search history.

(56) References Cited

U.S. PATENT DOCUMENTS

| 3,078,066 | A | * | 2/1963 | Moore ......................... 251/61.1 |
| 3,592,224 | A | * | 7/1971 | Bois .............................. 137/462 |
| 4,312,375 | A | * | 1/1982 | Leinemann .................. 137/489 |
| 4,376,523 | A |   | 3/1983 | Goyen |
| 4,624,442 | A | * | 11/1986 | Duffy et al. ................. 251/61.1 |
| 2004/0173765 | A1 |   | 9/2004 | Hsi-Chun |

FOREIGN PATENT DOCUMENTS

| EP | 0 423 572 | 4/1991 |
| WO | 2006/119889 | 11/2006 |

\* cited by examiner

*Primary Examiner* — John K Fristoe, Jr.
(74) *Attorney, Agent, or Firm* — Ladas & Parry LLP

(57) ABSTRACT

A finely adjustable firing valve for rapidly discharging compressed air or compressed gas, for the purpose of generating a pressure wave in silos or containers of granular materials, comprising a pneumatic main valve (1), a pneumatic secondary valve (9), arranged to control the main valve (1), and a pilot valve (16), arranged to control the secondary valve (9), said main valve (1) comprising a main valving element (7) of membrane type.

18 Claims, 2 Drawing Sheets

FINE ADJUSTABLE FIRING VALVE

The present invention relates to a finely adjustable valve for rapidly discharging compressed air or compressed gas, for the purpose of generating a pressure wave in silos or containers of granular materials.

In the state of the art, in preparing cements or agglomerates of various types, granular and pulverulent materials are used, made to flow from hoppers. In numerous other technical applications granular materials can be involved, for example in silos.

These materials often tend to undergo compaction and create solid lumps which hinder or even prevent material outflow.

These solid lumps are generally disintegrated and their constituent materials fluidised using powerful jets of air or other gases using a technique known as "firing".

This technique almost instantaneously introduces a large quantity of compressed gas at high pressure into the vicinity of these solid lumps, to produce impact waves which disintegrate them.

The gas quantity introduced must be such as to completely disperse its kinetic energy into the material present in the silo or hopper.

BG2005A000019 describes a firing valve comprising a valve body, an outflow conduit with a discharge and an access port to the outflow conduit for discharging the pressurized fluid, a chamber which connects said outflow conduit to said valve body, and a valving element which closes or opens the access port and is formed from a membrane fixed to the centre of the access port and flexing at its edge.

In firing valves only the high pressure part of the outflow is important for the purpose to be attained. The low pressure tail represents only a fluid loss which must be made up.

The useful energy of the air used in firing from the vessel regards the initial pressure wave pulse at maximum pressure, between 5 and 10 bar, whereas the firing tail, below 5 bar, has no practical effect and represents a loss, considering that this tail is also reloaded into the vessel to restore the starting conditions.

MI2002A000627 describes a system of valves which enable air discharge to be limited on reaching a pressure set by a pressure setting device. The valve system is composed of valves having a metal piston as the valving element.

According to current constructional logic, to operate with a maximum pressure for example of 10 bar, this valve system requires at least 3-4 bar of pressure difference to enable the system to open and to close in order to shut off the discharge air.

This is due mainly to the pressure drops occurring within this valve system.

This means that the vessel discharges until the set pressure is reached, which as stated cannot exceed 6-7 bar.

An object of the present invention is therefore to provide a valve which enables the aforesaid drawbacks to be overcome, a particular object being to allow fine adjustment and hence a discharge piloted by very small pressure differentials, of the order of a few tenths of a bar.

Another object is to limit the cost of re-establishing the starting pressure in the vessel.

Said objects are attained by a device, the characteristics of which are defined in the claims.

The invention will be more apparent from the ensuing detailed description of an embodiment thereof, provided by way of non-limiting example with reference to the accompanying drawings, in which.

Figure 1:
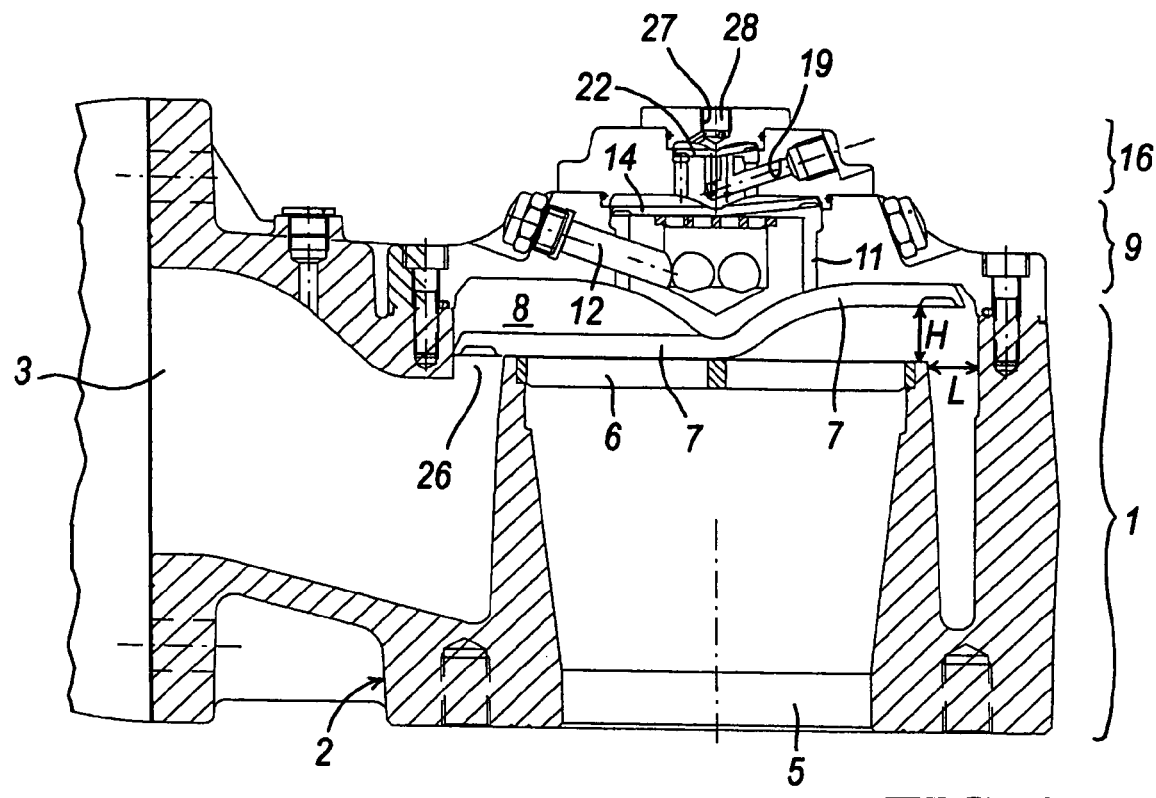
FIG. 1 is a longitudinal section through the valve according to the invention in which the valving elements in the part to the left of the valve axis are shown in their rest position, whereas the valving elements in the part to the right are shown during discharge.
Figure 2:
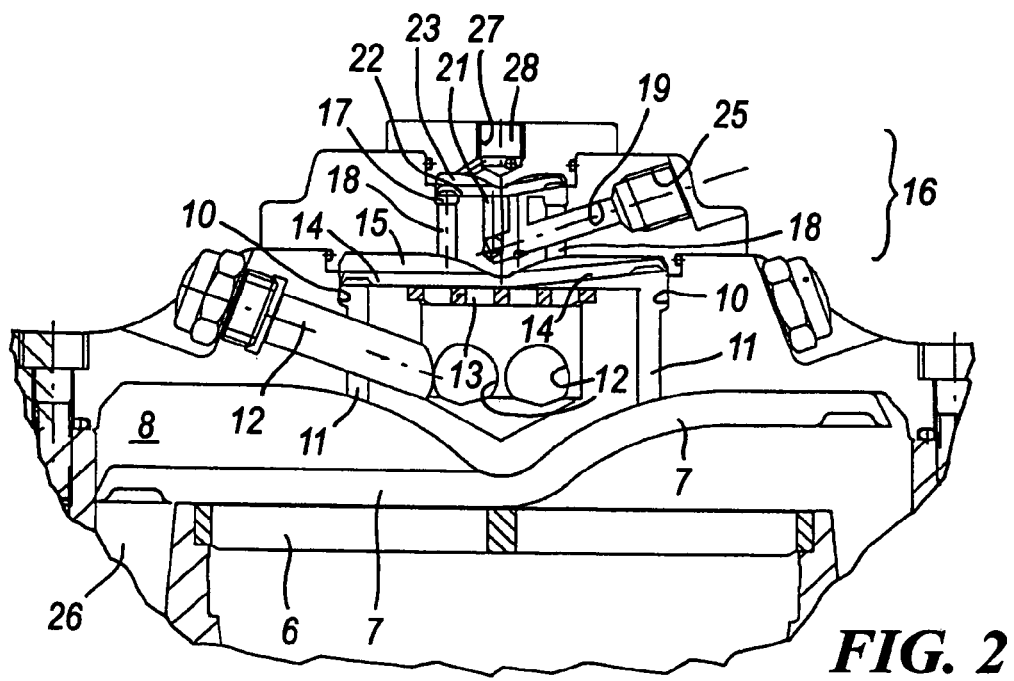
FIG. 2 shows an enlargement of the upper part of FIG. 1.

With reference to FIGS. 1 and 2, the pneumatic firing valve of the invention can be seen to comprise a total of three in-line pneumatic valves disposed on the same axis. The main valve 1 is controlled by the secondary valve 9 which, being of smaller dimensions than the main valve 1, can be operated by feeding a smaller mass of compressed air. The secondary valve is itself controlled by a pilot valve 16 which has smaller dimensions than the secondary valve and can hence be operated by feeding a smaller mass of compressed air than that required for the secondary valve. The three valves are disposed in line one directly on the other to minimize the length of the connection conduits between one valve and the other and to hence render the valve more efficient overall. The term "in line" means that the valves are disposed in series one close to another, i.e. with connection conduits between a larger dimension valve and a smaller dimension valve as short as possible, to limit the fluid quantity contained in them. These connection conduits must hence present a small inner volume, less than that of the actuation chamber of the larger dimension valve to which they are connected. In this respect, a smaller air mass in the secondary valve and pilot valve control circuits, consisting of connection conduits and actuation chambers, achieves a more rapid response in valve operation overall by setting a smaller pressure differential. To minimize the length of the connection conduits, the main valve 1, secondary valve 9 and pilot valve 16 are dispose coaxially one to another, the base of each valve forming the cover and top of the actuation chamber of the underlying valve.

Figure 3:
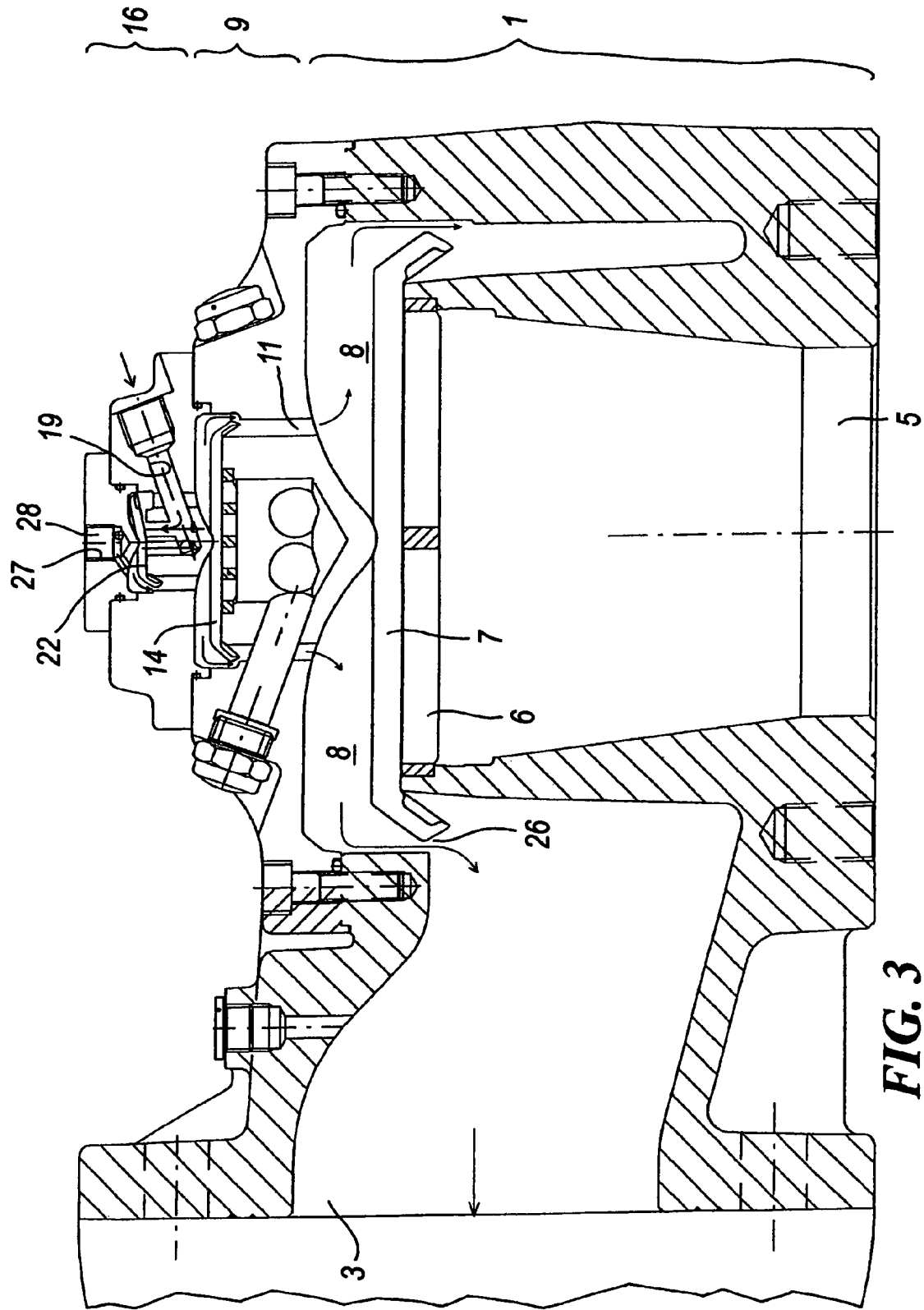
FIG. 3 is a longitudinal section through the valve of the invention during the loading stage.

The firing valve of the invention comprises a pneumatic main valve 1 presenting a valve body 2 with an inlet 3 and a discharge 5 which are connected together via a main actuation chamber 8. A main access 26 connects the inlet 3 to the main actuation chamber 8 and a main port 6 connects the main actuation chamber 8 to the discharge 5. A first connection conduit 11 opens into the main actuation chamber to connect it to a secondary actuation chamber 15 of the secondary valve 9. A main valving element 7 of membrane type is fixed to the centre via a protuberance on the top of the actuation chamber in which it is located. It can move within the main actuation chamber 8 by rising and falling peripherally to alternately connect the inlet 3 to the discharge (right side of FIGS. 1 and 2) or the inlet 3 to the first connection conduit 11 (FIG. 3). To minimize the volume of the main actuation chamber 8, the main access 26 and the main port 6 are disposed side by side. The main actuation chamber 8 has a shape such as to keep the passage cross-section between the main access 26 and the main port 6 constant so that there are no damaging restrictions in the cross-section, with consequent pressure drops or excessive volumes which would increase the system reaction inertia. This is achieved by making the perimetral passage cross-section at the height H of the main actuation chamber 8 substantially equal to the annular cross-section of the main access corresponding to the dimension L (FIG. 1) and to the passage cross-section of the main port 6.

A local compressed air reservoir, not shown as it does not form part of the valve, is connected to the inlet 3.

The main access 26 has an annular shape which extends about the main port 6. The main valving element 7 is a circular flexible membrane which extends with its edge beyond the main port 6. When at rest the main valving element 7 rests on the main port 6 to close both the main port 6 and the main access 26, to define in this manner the main actuation chamber 8. A pneumatic secondary valve 9 is disposed in line with the main valve 1 at the main actuation chamber 8, to control the main valve 1 by acting on the main valving element 7. To minimize the volume of the first connection conduit 11, the secondary valve 9 is disposed directly on the main valve 1, its base forming the top of the main conduit 8. In this manner the first connection conduit 11 presents the minimum length and hence the minimum volume possible, in any event less than that of the main actuation chamber 8. The pneumatic secondary valve 9 for opening the main valve 1 by acting on the main valving element 7 comprises a secondary actuation chamber 15, of volume less than the main actuation chamber 8, connected by said connection conduit 11 to the main actuation chamber 8, and a secondary discharge 12 to air, connected to the secondary actuation chamber 15. A secondary access 10 connects the first connection conduit 11 to the secondary actuation chamber 15, a secondary port 13 connecting the secondary actuation chamber 15 to the secondary discharge 12. A second connection conduit 18 opens into the secondary actuation chamber 15 to connect it to a pilot actuation chamber 23 of the pilot valve 16. A secondary valving element 14 of membrane type is fixed to the centre and can move by rising and falling peripherally to alternately connect the first connection conduit 11 to the secondary discharge 12 (right side of FIGS. 1 and 2) or the first connection conduit 11 to the second connection conduit 11 (FIG. 3). To minimize the volume of the secondary actuation chamber 15, the secondary access 10 and the secondary discharge 12 are disposed side by side. The secondary actuation chamber 15, as in the case of the main actuation chamber, has a shape such as to keep the passage cross-section between the secondary access 10 and the secondary discharge 12 constant so that there are no damaging restrictions in the cross-section, with consequent pressure drops or excessive volumes which would increase the system reaction inertia.

The task of the secondary valve 9 is to operate the main valve 1 by making the compressed gas located in the main actuation chamber 8 discharge rapidly. The secondary valve has smaller dimensions than the main valve. In particular the volume of the secondary actuation chamber 15 is less than that of the main actuation chamber 8. The secondary actuation chamber and the first connection conduit 11 form the control circuit for the secondary valve 9, arranged to act on the main valve 1. In a manner similar to the main valving element 7, the secondary valving element 14 comprises a circular flexible membrane which extends to cover the secondary port 13 with its central part and the secondary access 10 with its peripheral part. The first connection conduit 11 is in reality composed of a series of spaced conduits between which the secondary discharges 12 pass. The firing valve further comprises a pneumatic pilot valve 16 for controlling the secondary valve 9 by acting on the secondary valving element 14. The pilot valve 16 is disposed on line with the secondary valve 9, at the secondary actuation chamber 15. To minimize the volume of the second connection conduit 18, the pilot valve 16 is disposed directly on the secondary valve 9, its base forming the top of the secondary conduit 15. In this manner the second connection conduit 18 presents the minimum length and hence the minimum volume possible, in any event less than that of the secondary actuation chamber 15.

Said pilot valve 16 presents a pilot actuation chamber 23, of volume less than the secondary actuation chamber 15, connected by said second connection conduit 18 to the secondary actuation chamber 15, and a pilot discharge 19 to air connected to the pilot actuation chamber 23. A pilot access 10 connects the second connection conduit 18 to the pilot actuation chamber 23, a pilot port 21 connecting the pilot actuation chamber 23 to the pilot discharge 19. An operating conduit 28 opens into the pilot actuation chamber 23, and presents connection means 27 to enable a control pressure setting device (not shown for simplicity) to be connected. A pilot valving element 22 of membrane type is fixed to the centre and can move by rising and falling peripherally to alternately connect the second connection conduit 18 to the pilot discharge 19 (right side of FIGS. 1 and 2) or the second connection conduit 18 to the operating conduit 28 (FIG. 3). To minimize the volume of the pilot actuation chamber 23, the pilot access 17 and the pilot port 21 are disposed side by side. The pilot actuation chamber 23, as in the case of the main and secondary actuation chamber, has a shape such as to render the passage cross-section between the pilot access 17 and the pilot port 21 substantially constant.

The pilot valve 16 has smaller dimensions than the main valve. In particular the volume of the pilot valve actuation chamber 23 is less than that of the secondary actuation chamber 15. In a manner similar to the aforegoing, the pilot valving element 22 is a circular membrane which when in its rest position extends to cover the pilot port 21 with its central part and the pilot access 17 with its peripheral part. The pilot discharge 19 can be connected to a compressed gas feed device, by means of a feed connector 25.

The second connection conduit 18 has an open ring ("C") cross-section to allow passage of the pilot discharge 19. The pilot discharge 19 terminates with the feed connector 25 and hence serves both as a discharge conduit (discharge stage) and for feeding the gas (feed stage).

For a more compact construction and to limit the length and volume of the connection conduits, the base of the secondary valve 9, disposed on the main valve 1, defines the top of the main actuation chamber 8, while the base of the pilot valve 16, disposed on the secondary valve 9, defines the top of the secondary actuation chamber 15.

The main valving element 7, the secondary valving element 14 and the pilot valving element 22 are formed with a circular membrane which is both flexible and robust, for example consisting of rubber, or polyurethane, or viton, or various elastomers, or harmonic steel, with a hardness between 50 and 100 Shore. They are fixed at their centre and are arranged to rise peripherally, to enable the main port 6, the secondary port 13 and the pilot port 21 to open. Said valving elements are substantially flat and of constant thickness, which is small to limit the dimensions of the respective actuation chambers. Membrane valving elements enable the volume of the respective actuation chambers to be minimized because the guides which would be required for rigid valving elements, for example, of piston type, do not exist. A membrane valving element is also simple, robust and economical. The fact of rising peripherally and being fixed at its centre allows rapid opening with a large cross-section for passage in minimum times. Instead of being fixed at their centre, the membrane valving elements can evidently belly at their centre. However for equal passage cross-sections this solution requires a larger valve diameter and hence greater costs.

The main actuation chamber 8, secondary actuation chamber 15 and pilot actuation chamber 23 must have a size such as to ensure, with the valving elements open, substantially the same passage cross-section as exists through the main access 26, the secondary access 10 and the pilot access 17 respectively.

The inner surface of the main actuation chamber 8, the secondary actuation chamber 15 and the pilot actuation chamber 23 is modelled such as to have a central cusp, which projects towards the valve interior, degrading outwards with a gradually decreasing slope. The cusps centrally fix the valving elements onto a grid located below them. The distance between the inner surface of the actuation chambers and the underlying grid is minimal at the centre in correspondence with the cusp and gradually increases in withdrawing from the centre. Other central fixing or guide systems for the valving elements are naturally possible.

The operation of the firing valve according to the invention can be divided into three stages: a loading stage, a rest stage and a discharge stage.

FIG. 3 shows the valve during the loading stage, where the gas outflow during the loading stage is represented by the arrows. In this stage, a compressed gas feed device is connected to the feed connector 25. The pressurized gas causes the pilot valving element 22 to rise and enters the second connection conduit 18. The pressurized gas passes through the second connection conduit 18 to enter the secondary actuation chamber 15, it flexes the peripheral part of the secondary valving element 14 and enters the main actuation chamber 8 by passing through the first connection conduit 11.

From the main actuation chamber 8, the pressurized gas flexes the projecting peripheral part of the main valving element 7 and, by way of the main access 26 and inlet 3, flows out into the storage vessel to which the firing valve is connected. The loading stage continues until a pressure equal to the feed pressure has been reached in the storage vessel.

During the rest stage, (valving elements disposed as represented in the left part of FIG. 1 and the corresponding enlargement of FIG. 2) the storage vessel is under the same pressure as the compressed gas feed device, so that the compressed gas ceases to flow to the storage vessel.

When the compressed gas feed device is disconnected from the feed connector 25, the pilot discharge 19 is at atmospheric pressure and gas discharges from its pressure in the storage vessel to the control pressure fixed by the pressure setting device: urged by the underlying greater pressure, the pilot valving element rises (right part of FIG. 1 and the corresponding enlargement of FIG. 2) and the pressurized gas present in the secondary actuation chamber 15 flows rapidly outwards through the second connection conduit 18, the pilot access 17, the pilot actuation chamber 23, the pilot port 21 and the pilot discharge 19. In order to minimize discharge times and achieve a more rapid response at the set pressure, the second connection conduit 18 must be as short as possible. In this respect, the pressurized gas contained in this conduit is added to that contained in the secondary actuation chamber 15 to determine a greater response inertia.

As the pressurized gas flows out of the secondary actuation chamber 15, urged by the pressure in the main actuation chamber 8, the secondary valving element 14 rises and the pressurized gas present in the main actuation chamber 8 flows out through the first connection conduit 11, the secondary access 10, the secondary actuation chamber 15, the secondary port 13, and the secondary discharge 12. This pressurized gas cannot flow out through the pilot discharge 19, as the second connection conduit 18 is closed by the valving element 14 in its raised position.

The first connection conduit 11 must also be as short as possible, to limit the pressurized gas contained in it during the rest stage and hence limit the system response inertia at the moment of discharge. To achieve a more rapid pressurized gas discharge, the secondary discharge 12 comprises a plurality of exit nozzles.

When the pressurized gas flows from the main actuation chamber 8, the main valving element 7 rises, urged by the pressure in the storage vessel through the inlet mouth 3, that the pressurized gas present in the storage vessel flows violently out through the main access 26, the main actuation chamber 8, the main port 6, and the discharge 5, to create a pressure wave able to crush the material blocks which form within the silo or container to which the firing valve is connected.

As soon as the pressure in the inlet 3, in the first connection conduit 11 and in the second connection conduit 18 falls (by just some tenths of a bar) below the set control pressure in the operating conduit 28, the valving elements 7, 14 and 22 reclose the respective discharges to preclude the exit of further air, which consequently remains stored in the vessel at a pressure close to the set value.

By virtue of the fact that the main valve 1 is controlled by an in-line secondary valve 9 of smaller dimensions than the main valve, with a first connection conduit 11 of volume less than that of the main actuation chamber 8, and the secondary valve 9 is controlled by a pilot valve 16 also in line with the other two valves and of smaller dimensions than the secondary valve 9, with a second connection conduit 18 of volume less than that of the secondary actuation chamber 15, a fine adjustment can be achieved and the pressurized storage vessel connected to the inlet 3 can be discharged by a controlling pressure difference which is minimal, of the order of some tenths of a bar. A discharge from for example 10 bar to 9.5 bar can be achieved, so avoiding emptying the storage vessel and making it very simple and cheap to re-establish the compressed air reserve.

As the valving elements 6, 14 and 22 are formed with flexible membranes fixed at their centre and rising or flexing peripherally, they allow rapid opening of the respective valves by small movements and hence with a main actuation chamber 8 and secondary actuation chamber 15 of small volume.

The present invention enables the discharge air flow to be shut off with a pressure difference of just a few tenths of a bar (for example 0.5 bar) between the pressure present in the vessel and the control pressure.

The solution presented herein attains these results by virtue of minimum possible air volumes in play within the valves, in particular for the larger valves 1 and 9, and by using in an innovative manner a system comprising three flat valving elements interacting one with another on the same axis. These valving elements enable the air volumes concerned in their opening and closure and the interspaces or chambers between one valving element and another to be reduced to a minimum.

The valve overall is compact, of simple construction and of low cost.

The present invention could also be used for other applications such as for partially discharging overpressures instantaneously, but in particular in a controlled manner as in the case of dangerous fluids, or for energy saving.

The invention claimed is:

1. A finely adjustable firing valve for rapidly discharging compressed air or compressed gas, for the purpose of generating a pressure wave in silos or containers of granular materials, comprising
   a pneumatic main valve (1) presenting a valve body (2) with an inlet (3) and a discharge (5) connected together via a main actuation chamber (8),
   a main access (26) connecting the inlet (3) to the main actuation chamber (8), and
   a main port (6) connecting the main actuation chamber (8) to the discharge (5),
   said main valve (1) also comprising
   a main valving element (7) arranged to move within said main actuation chamber (8) to alternately connect the inlet (3) to the discharge (5) or the inlet (3) to a first connection conduit (11) which opens into the main actuation chamber (8), said firing valve further comprising a pneumatic secondary valve (9), arranged to control the main valve (1) by acting on said main valving element (7), and comprising a secondary actuation chamber (15) of volume less than the main actuation chamber (8), and connected by said first connection conduit (11) to the main actuation chamber (8), a secondary discharge (12) connected to the secondary actuation chamber (15), a secondary access (10) connecting the first connection conduit (11) to the secondary actuation chamber (15), and a secondary port (13) connecting the secondary actuation chamber (15) to the secondary discharge (12), said secondary valve (9) also comprising a secondary valving element (14) arranged to move within said secondary actuation chamber (15) to alternately connect the first connection conduit (11) to the secondary discharge (12) or the first connection conduit (11) to a second connection conduit (18) which opens into the secondary actuation chamber (15), said firing valve further comprising a pilot valve (16), arranged to control the secondary valve (9) by acting on said secondary valving element (14) via said connection conduit (18), characterised in that said main valving element (7) is of membrane type, it is fixed to the centre of the main actuation chamber (8), and it can move within the main actuation chamber (8) by rising and falling peripherally.

2. A firing valve as claimed in claim 1, characterised in that said secondary valving element (14) is of membrane type.

3. A firing valve as claimed in claim 1, characterised in that said pilot valve (16) is of pneumatic type.

4. A firing valve as claimed in claim 1, characterised in that said pilot valve (16) presents a pilot actuation chamber (23) of volume less than the secondary actuation chamber (15), and connected by said second connection conduit (18) to the secondary actuation chamber (15), a pilot discharge (19) connected to the pilot actuation chamber (23), a pilot access (17) connecting the second connection conduit (18) to the pilot actuation chamber (23), and a pilot port (21) connecting the pilot actuation chamber (23) to the pilot discharge (18), said pilot valve (22) also comprising a pilot valving element (22) arranged to move within said pilot actuation chamber (23) to alternately connect the second connection conduit (18) to the pilot discharge (19) or the second connection conduit (18) to an operating conduit (28) which opens into the pilot actuation chamber (15).

5. A firing valve as claimed in claim 1, characterised in that said pilot valving element (22) is of membrane type.

6. A firing valve as claimed in claim 1, characterised in that said secondary valve (9) is disposed on the main valve (1) and presents a base which at least partially defines the surface of the main actuation chamber (8).

7. A firing valve as claimed in claim 1, characterised in that the pilot valve (16) is disposed on the secondary valve (9) and presents a base which at least partially defines the surface of the secondary actuation chamber (15).

8. A firing valve as claimed in claim 1, characterised in that said first connection conduit (11) has a smaller volume than the main actuation chamber (8).

9. A firing valve as claimed in claim 1, characterised in that said second connection conduit (18) has a smaller volume than the secondary actuation chamber (15).

10. A firing valve as claimed in claim 1, characterised in that the main actuation chamber (8) has a shape such as to render the passage cross-section between the main access (26) and the main port (6) substantially constant and to minimize its volume.

11. A firing valve as claimed in claim 1, characterised in that the secondary actuation chamber (15) has a shape such as to render the passage cross-section between the secondary access (10) and the secondary port (13) substantially constant and to minimize its volume.

12. A firing valve as claimed in claim 4, characterised in that the pilot actuation chamber (23) has a shape such as to render the passage cross-section between the pilot access (17) and the pilot port (22) substantially constant and to minimize its volume.

13. A firing valve as claimed in claim 1, characterised in that said main valving element (7) is arranged to rise peripherally, to connect the inlet (3) to the discharge (5).

14. A firing valve as claimed in claim 2, characterised in that said secondary valving element (14) is arranged to rise peripherally, to connect the first connection conduit (11) to the secondary discharge (12).

15. A firing valve as claimed in claim 4, characterised in that said pilot valving element (22) is arranged to rise peripherally, to connect the second connection conduit (18) to the pilot discharge (19).

16. A firing valve as claimed in claim 4, characterised in that said operating conduit (28) of the pilot valve (22) comprises means (27) for connection to a device for setting the pressure at the pilot actuation chamber (23).

17. A firing valve as claimed in claim 4, characterised in that pilot discharge (19) terminates with a feed connector (25) for connection to a compressed gas feed device.

18. A firing valve as claimed in claim 1, characterised in that at least one from among said main valving element (7), secondary valving element (14) and pilot valving element (22) is fixed at its centre.

* * * * *

UNITED STATES PATENT AND TRADEMARK OFFICE
CERTIFICATE OF CORRECTION

| | | |
|---|---|---|
| PATENT NO. | : 7,997,556 B2 | Page 1 of 1 |
| APPLICATION NO. | : 12/374053 | |
| DATED | : August 16, 2011 | |
| INVENTOR(S) | : Genio Migliorati | |

It is certified that error appears in the above-identified patent and that said Letters Patent is hereby corrected as shown below:

Title page item (54), and col. 1

Title, "Fine" should read --Finely--.

Signed and Sealed this
Tenth Day of April, 2012

David J. Kappos
*Director of the United States Patent and Trademark Office*